Patented June 9, 1925.

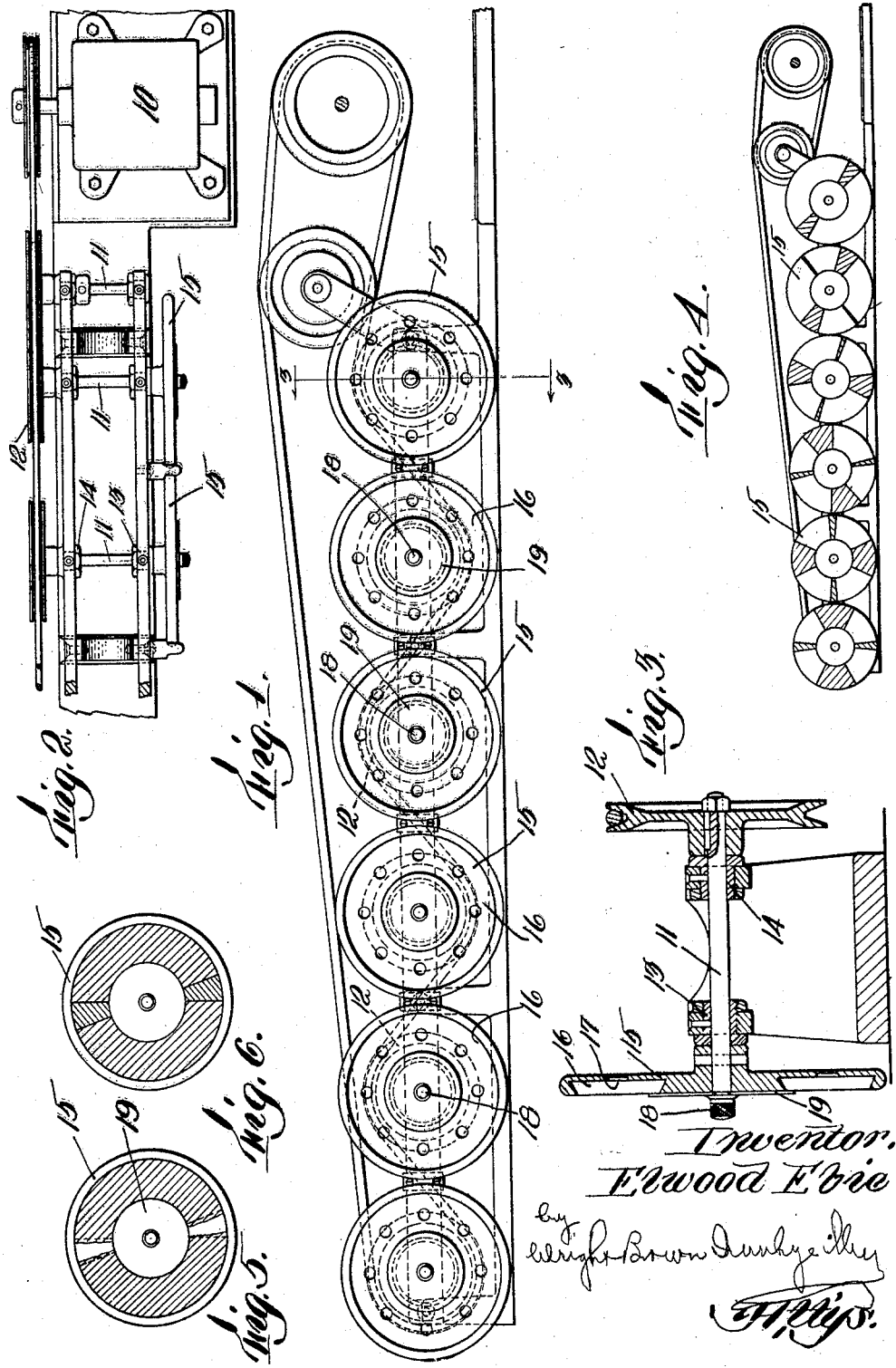

1,540,768

UNITED STATES PATENT OFFICE.

ELWOOD EBIE, OF BERLIN, NEW HAMPSHIRE, ASSIGNOR TO BROWN COMPANY, OF BERLIN, NEW HAMPSHIRE, A CORPORATION OF MAINE.

METHOD OF AND MEANS FOR THE MEASUREMENT OF COLORS.

Application filed September 1, 1921. Serial No. 497,588.

*To all whom it may concern:*

Be it known that I, ELWOOD EBIE, a citizen of the United States, residing at Berlin, in the county of Coos and State of New Hampshire, have invented new and useful Improvements in Methods of and Means for the Measurement of Colors, of which the following is a specification.

This invention has for its object to provide a method and means by which one may measure the color of bleached pulp, paper or other materials, and classify such materials according to their color value, and hence to enable one to specify in advance and with exactness the standard to which the material must conform. Bleached pulp, for example, varies considerably in tint, and the measurement of the extent to which any given batch varies from white is of commercial importance and has proven a source of difficulty to producers and users of pulp.

Probably the most widely used method is that described in "Paper", Vol. XIX, pp. 18, 19 (1916), in which discs of the pulp are matched with a series of arbitrary color standards, consisting of rotary wheels covered or faced with plaster tinted to various shades of light yellow by a soluble material,—potassium chromate. A disc of pulp is secured to each of the standard wheels, and the whole series being rotated at a speed high enough to eliminate the effect of surface irregularities, the whole set is viewed at once under constant conditions of illumination. The standard wheels are given arbitrary numbers, according to the shade of yellow, and the pulp is given the number of the color wheel which it matches or most nearly matches.

There are several difficulties attendant upon or inherent to this method, which diminish its usefulness or value. Probably the most serious of these is due to the use of the soluble coloring matter, as a result of which, while the plaster is setting, varying amounts of the potassium chromate rise to the surface, due to capillary action and evaporation, giving a non-uniformly colored face to the wheel. Moreover, since the faces of the wheels become discolored in use, rendering it necessary from time to time to turn them down or reface them with an appropriate tool such as a chisel, the chromate which is segregated at the surface is removed, and the wheel grows gradually white in color. Again, it is difficult to reproduce with exactness as to color the standard wheels, rendering the standardization uncertain and frequently inaccurate.

These difficulties are met in the present process by the employment of an insoluble reproducible pigment in lieu of a soluble coloring matter such as potassium chromate, and the selection of such pigments which do not change their color on prolonged exposure to light and air. In addition, and according to another feature of my invention, instead of forming the entire faces of the color wheels of a mixture of plaster and pigment in different proportions so as to present different hues or tints, the desired color effect is produced by the use of a single mixture in predetermined proportions of plaster or other suitable body and pigment, of a predetermined color. In this case, the wheels are surfaced to produce sectors which vary in color, as for example white and yellow, and the color effect of the different wheels (when rotating) is varied by varying the relative areas of the sectors. Thus a color wheel may have a large sector or field of pure white plaster, and a small sector of the plaster-pigment mixture, and present, when in rotation, a slightly yellowish color. By decreasing the white area and increasing the yellow area, the effect produced, when the wheel is in rotation, is of a deeper yellowish color. The area of the colored sector, therefore, determines the final color effect produced, and consequently the numbers or color values may be standardized according to the areas of the colored sectors.

It is also possible to vary the color effect by employing sectors of different colors. For example, to give a grayish tone or hue, one sector may be black, another yellow and a third white; or, if desired, there may be a blue or a red sector. Arbitrary standards may thus be selected according to the numbers and sizes or areas of the sectors of different colors. In all the wheels the corresponding sectors, whether blue, black, yellow or the like, are identical in color, and vary only as to area. This is of marked importance, for, having ascertained the exact proportions in which the plaster and pigment are mixed, the same technique may be followed thereafter with precisely the same results as to the color of the mixture.

For the purpose of illustrating an apparatus which may be employed in carrying out my method, reference may be had to the accompanying drawings in which,—

Figure 1 shows in front view a machine having a series of color wheels arranged to be driven simultaneously.

Figure 2 shows a plan view of a portion of the same.

Figure 3 represents a transverse section on the line 3—3 of Figure 1.

Figure 4 shows on a smaller scale the machine in front elevation and illustrates different types of color wheels which may be employed.

Figures 5 and 6 illustrate the method of forming the colored sectors in or on the wheels.

Of course it will be understood that any suitable apparatus may be employed in lieu of that shown in the drawings, and hereinafter described, as all that is necessary is one or more wheels and means for effecting its or their rotation. The illustrated machine, which per se is substantially identical, except as to the formation of the faces of the wheels, with that recommended by the committee on sulphite pulp of the Technical Association of the Pulp and Paper Industry, as set forth in the publication hereinbefore referred to, is eminently satisfactory for the purpose. Briefly, it consists of a frame, on which is located an electric motor 10, which by a belt or cord drives a series of horizontally arranged shafts 11 through the medium of pulleys 12 thereon. The shafts are journaled in suitable bearings 13, 14, and on the front end of each there is pinned a wheel 15 which may be in the form of a disc with an under-cut annular groove 16 in its face. In the bottom of the groove are recesses or sockets 17. On the end of each shaft, a knurled knob 18 is screwed, by which a disc 19 of paper or pulp may be clamped against the central portion of the wheel. Heretofore the wheels have had the grooves filled with colored plaster, each wheel however presenting a face of unvarying color or tint except as it might be imperfect due to segregation of the soluble pigment in the varying blotches in the face thereof. In such case, discs cut from the same sheet of paper or pulp were secured to the several wheels, which were all rotated at high speed, so that a comparison could be effected between each pulp disc and its supporting wheel to see if the pulp matched in color any one of the discs.

As previously stated, I do not employ soluble potassium chromate. On the contrary, to obviate the difficulties herein referred to due to the use of soluble coloring matter, I employ an insoluble non-fading pigment. Also, instead of employing commercial plaster of Paris, which varies widely in color, and thus also introduces an element of uncertainty in securing the desired color or tint in the wheel, I preferably employ chemically pure plaster of Paris.

In preparing the white plaster, one may proceed, if desired, as follows:—Dissolve 410 grams of C. P. anhydrous calcium chloride in 4 to 5 liters of water (distilled). Cool the solution to 20° C. and add a solution of sulphuric acid made by pouring 192 c. c. of concentrated acid to 1 liter of cold distilled water and cooling to 20° C. Allow to stand at 20° C. for an hour or two, then filter on a Buchner funnel and wash free of acid with distilled water. The temperature of precipitation is important to insure the proper water of crystallization in the finished plaster. The precipitate is dried over night (16–17 hours) at 65° C. After drying it is broken to pass through a ten-mesh sieve, placed in an evaporating dish and calcined at 110° C. over night (16–17 hours). The calcined plaster is then allowed to stand exposed to the atmosphere for about eight hours, when it will be found to have taken up water until the total water content is between 5% and 9%. The finished plaster is soft and does not require grinding.

Of course, the foregoing procedure need not be followed but it is given as one method of producing a pure white plaster which may be used either alone or when colored with a pigment.

The plaster, in any event, may be hardened by the use of a colorless water-soluble colloid, which does not darken on exposure to air and light such as a gum arabic solution (e. g. 10% solution, distilled water), which may be employed instead of water alone in preparing the plaster for setting.

For the pigmentation of the plaster to produce different colors, I may employ reproducible non-fading pigments such, for example, as lamp black for black sectors, zinc chromate for yellow sectors, nickel dimethyl glyoxime for the red sectors, and Prussian blue for the blue sectors. Other pigments for producing the same or other colors may be used, as desired. In any event, it is desirable and essential for the best results through a long period of time that the permanence of the pigment should persist or remain unvarying when exposed to light and air, that the pigment should be capable of fine subdivision, that the conditions of its preparation should be capable of being stated with sufficient accuracy that one can reproduce it with confidence that its hue and saturation will be unvarying, and that differences in the "covering power" of the pigment (due to variations in the coarseness or fineness of the particles when comminuted) may be eliminated.

To produce a suitable yellow pigment, one may proceed as follows:—Dissolve 30 grams of C. P. zinc chloride in 1400 c. c. of distilled water and bring to boiling. Add concentrated sulphuric acid slowly, drop by drop, until the precipitated zinc hydroxide is just dissolved. (Care must be taken not to add an excess of acid because the color of the zinc chromate precipitated depends on the concentration of ammonium hydroxide added later.) While boiling, add a boiling solution of 20 grams potassium chromate dissolved in 600 c. c. of water. Continue boiling for a minute or two. Then remove from the heater and while stirring vigorously add 36 c. c. of concentrated ammonium hydroxide (28%–29% $NH_3$) from a burette, slowly (5 c. c. per minute). Allow to settle and filter on a Buchner funnel. Wash with boiling distilled water until wash water is colorless or very nearly so. Dry at 110° C. for several hours. If washing is not complete, the dried precipitate will have spots of deep reddish yellow. These can be removed by additional washing.

The red nickel dimethyl glyoxime may be precipitated from a slightly ammoniacal solution of a nickel salt by means of an alcohol solution of dimethyl glyoxime.

In making the blue sectors, the Prussian blue and calcium sulphate may be precipitated from the same solution at the same time by mixing solutions of calcium chloride, a soluble sulphate, ferric chloride, and a soluble ferrocyanide.

While red nickel dimethyl glyoxime is not strictly an inorganic pigment as are the others herein referred to, yet, like them, it is insoluble in the liquid vehicle and possesses the desired permanence of hue and fineness of grain.

In mixing the plaster and the pigment, care should be exercised to effect a thorough and physically homogeneous mixture. For the yellow sectors, one may grind 20 parts of the yellow pigment and 80 parts of plaster until the mixture does not change on further grinding. Preferably it should be capable of passing through a 100-mesh sieve.

The proportions of the pigment and plaster may, of course, be varied, but, once having determined a standard mixture, it should not be changed thereafter.

Assuming that a wheel is to have both white and yellow sectors, the area to be covered by each is carefully marked on the wheel. The white or the colored plaster is mixed in a thin putty-like consistency with the gum arabic solution and applied to the proper part of the wheel, in the facial groove thereof, as shown in Figure 5, and those portions which project beyond the radial lines bounding the sector may be cut after the plaster has set. Usually the white plaster is first applied, and then the colored plaster is applied. Preferably the thickness of the plaster layers should be sufficient to permit the wheel to be faced on a lathe by means of a suitable tool. Of course, after the sectors are filled, the plaster must be dried, and this may be done at a temperature of about 65° C. for four to five hours.

I find it desirable to moisten the surface of the wheel, after it has been smoothly faced on a lathe, and the dust removed, with distilled water to bind the loose particles and to form a film of gum over the surface. The colored portion is formed or divided into a plurality of sectors, which are spaced equi-distant about the center, so that the speed of rotation of the disks, to prevent flickering, may be relatively low. Thus, instead of one sector of relatively large area, I may form two or more sectors, which total the same in area.

The wheels of a given series are all different, so as to enable one to match a given sheet of pulp or paper with one of them.

As indicating how the wheels of a series may vary, and a standardization may be affected according to the color value, one may have a series as follows:—

| Value of wheel | White sector | Yellow sector | Black sector |
| --- | --- | --- | --- |
|  | Degrees | Degrees | Degrees |
| 100 | 320 | 40 | 0 |
| 95 | 300 | 55 | 5 |
| 90 | 280 | 70 | 10 |
| 85 | 260 | 85 | 15 |
| 80 | 240 | 100 | 20 |
| 75 | 220 | 115 | 25 |

From the foregoing, it is apparent that a standardization of the color values is easily effected, and this having once been effected, the color wheels may be reproduced with certainty as to their hue or color value.

What I claim is:—

1. Mechanism for gaging color values, comprising a series of rotary members each having permanent opaque sectors of different nonfading colors, the sectors of the one color diminishing in area in the series and the sectors of another color increasing in area, said sectors being capable of reduction in thickness without variation from their original colors.

2. Mechanism for gaging color values, comprising a series of rotary members each having diametrically spaced permanent opaque areas of one color and intervening areas of one or more colors, the first-mentioned areas gradually varying in size in said series and the colors being nonfading, nonvariable and reproducible.

3. Mechanism for gaging color values, comprising a series of rotary members having opaque white and colored sectors, the white sectors being formed of plaster of Paris and gradually diminishing in area progressively in the series and the colored sectors being formed of a homogeneous mixture of plaster of Paris and a nonfading insoluble pigment and gradually and correspondingly increasing in area in the series.

4. Mechanism for gaging color values, comprising a series of rotary members each having a plaster face of appreciable thickness, colored with an insoluble invariable reproducible nonfading pigment in homogeneous mixture with said plaster face.

5. A color wheel having a layer of plaster of Paris mixed with an insoluble nonfading finely-divided pigment of an invariable reproducible color.

6. A color wheel having a layer of plaster of Paris mixed with an insoluble nonfading finely-divided pigment invariable and reproducible in color, and hardened with a colorless water-soluble colloid which does not darken on exposure to light and air.

7. A color wheel having a layer of plaster of Paris mixed with an insoluble nonfading finely-divided pigment of an invariable reproducible color, and hardened with gum arabic.

8. Mechanism for gaging color values, comprising a series of rotary members each having sectors consisting of layers of plaster of Paris, one or more of each of such sectors being colored by an insoluble reproducible nonfading pigment mixed with the plaster.

9. Mechanism for gaging color values, comprising a series of rotary members each faced with a layer of plaster of Paris, said members having sectors, which gradually increase in area in the series, in which zinc chromate is in homogenous admixture with the plaster to impart the same color to all of said sectors.

10. Mechanism for gaging color values, comprising a series of rotary members each faced with a layer of plaster of Paris, said members having colored sectors, which gradually increase in area in the series, in which a reproducible nonfading insoluble pigment of an invariable color is in homogeneous admixture with the plaster to impart the same color to all of said sectors, said sectors contrasting in color to other sectors of said members, which diminish in area in said series.

11. Mechanism for gaging color values, comprising a series of rotary members, faced with plaster in a layer of appreciable thickness, said members having the facings divided into white sectors and sectors colored by a water-insoluble nonfading pigment in homogeneous admixture with said plaster, said colored sectors gradually increasing in area in the series and the white sectors gradually and correspondingly diminishing in area in the sectors.

In testimony whereof I have affixed my signature.

ELWOOD EBIE.